United States Patent
Ogino (10) Patent No.: US 8,144,265 B2
(45) Date of Patent: Mar. 27, 2012

(54) LIQUID CRYSTAL TELEVISION RECEIVER AND LIQUID CRYSTAL DISPLAY DEVICE

(75) Inventor: Yoshihiro Ogino, Osaka (JP)

(73) Assignee: Funai Electric Co., Ltd., Daito-shi, Osaka (JP)

(*) Notice: Subject to any disclaimer, the term of this patent is extended or adjusted under 35 U.S.C. 154(b) by 1188 days.

(21) Appl. No.: 11/977,595

(22) Filed: Oct. 25, 2007

(65) Prior Publication Data

US 2008/0100757 A1 May 1, 2008

(30) Foreign Application Priority Data

Oct. 26, 2006 (JP) .............................. JP2006-291063

(51) Int. Cl.
*H04N 3/14* (2006.01)
(52) U.S. Cl. .................................................. 348/790
(58) Field of Classification Search ................... 348/790
See application file for complete search history.

(56) References Cited

U.S. PATENT DOCUMENTS

| 5,078,476 | A  | * | 1/1992  | Shin .............................. 345/102 |
| 7,911,541 | B2 | * | 3/2011  | Yamamoto et al. ........... 348/655 |
| 2004/0217719 | A1 |   | 11/2004 | Higuchi |
| 2005/0212916 | A1 | * | 9/2005  | Nakamura et al. ....... 348/207.99 |
| 2005/0243052 | A1 |   | 11/2005 | Lim |
| 2009/0244396 | A1 | * | 10/2009 | Takata ........................... 348/725 |

FOREIGN PATENT DOCUMENTS

| DE | 10101275 A | 7/2002 |
| JP | H07-013128 A | 1/1995 |
| JP | 07-039174 U | 7/1995 |
| JP | 08-237579 | 9/1996 |
| JP | 2003-319198 A | 11/2003 |
| JP | 2006-013942 | 1/2006 |
| JP | 3119099 U | 1/2006 |
| JP | 2006-140647 A | 6/2006 |

OTHER PUBLICATIONS

The extended European search report, pursuant to Rule 62 EPC dated Apr. 21, 2008, searched on Apr. 11, 2008.
Japanese Notice of the reason for refusal, dated Oct. 29, 2008.

* cited by examiner

*Primary Examiner* — Pankaj Kumar
*Assistant Examiner* — Charles N Hicks
(74) *Attorney, Agent, or Firm* — Yokoi & Co., U.S.A., Inc.; Toshiyuki Yokoi

(57) ABSTRACT

The liquid crystal television receiver comprises an inverter circuit 28, transistors Q14, Q13, and a microcomputer 22. The inverter circuit 28 includes resistors R5, R6, R7, R8 determining the value of a tube current that is supplied to cold cathode fluorescent tubes of a backlight 26, and supplies to the cold cathode fluorescent tubes an alternating voltage. An emitter and a collector of the transistor Q14 are connected to two opposite ends of the resistor R6, and an emitter and a collector of the transistor Q13 are connected to two opposite ends of the resistor R7. The microcomputer 22 has a control terminal connected to bases of the transistors Q13, Q14, and detects a synchronizing signal in an image signal inputted to an image signal processing portion 12.

4 Claims, 4 Drawing Sheets

LIQUID CRYSTAL TELEVISION RECEIVER AND LIQUID CRYSTAL DISPLAY DEVICE

CROSS-REFERENCES TO RELATED APPLICATIONS

The present application is related to the Japanese Patent Application No. 2006-291063, filed Oct. 26, 2006, the entire disclosure of which is expressly incorporated by reference herein.

BACKGROUND OF THE INVENTION (1) Field of the Invention

The present invention relates to a liquid crystal television receiver and a liquid crystal display device.

(2) Description of the Related Art

A liquid crystal display device such as a liquid crystal television receiver includes a backlight constituted by a discharge lamp which consumes relatively high electric power. When such a liquid crystal display device is kept powered on without any image signal inputted, the backlight is held on while a cell opening ratio of a liquid crystal panel of the display device is minimum, resulting in waste of electric power at the backlight.

To solve this problem, there has been proposed a technique, as disclosed in JP-A-2006-13942, in which when input of image signals from an external input terminal has been suspended for a predetermined continuous time period with the external input terminal selected through a remote control device or others, a controller outputs a control signal to a backlight drive circuit to turn off a part of a plurality of discharge lamps that is other than a discharge lamp or lamps opposed to characters or a figure displayed by an OSD (on-screen display) processing portion.

Further, JP-A-7-39174 discloses a technique where power is inputted from a dc battery to a backlight via an emitter-collector of a transistor. In this technique, when a predetermined time is elapsed after input from a tuner is suspended, a base voltage of the transistor is lowered to lower an input voltage to the backlight so as to decrease the value of a tube current of the backlight. A similar technique is disclosed in JP-A-8-237579 in which an illuminance of a backlight is lowered by lowering an electric power supplied to the backlight. JP-A-2006-140647 discloses a technique where a backlight control circuit stepwise drops a voltage supplied to a backlight.

However, the technique of JP-A-2006-13942 has a drawback that much time is taken to resume operation of the display device upon an image signal is inputted again after input of image signals is suspended, since the discharge lamp itself is turned off during the suspension. In addition, when the discharge lamp having been off is turned on upon the resuming of operation, the luminance varies among the discharge lamps, more specifically, between the discharge lamp(s) having been on and the other discharge lamp(s) having been off. This makes a user feel uncomfortable.

On the other hand, the technique of JP-A-7-39174 is inapplicable to a high-voltage line supplying a relatively high voltage, since the electric power is supplied via a transistor. Thus, the technique can not be used with a backlight driven at a high voltage. More specifically, although a voltage required for turning on a LED is about 2V, voltages required for turning a hot cathode tube and a cold cathode fluorescent tube, respectively, are as high as about 70V-140V and about 200V-1000V, which the technique of JP-A-7-39174 is incompatible with. JP-A-8-237579 and JP-A-2006-140647 do not teach any circuit configuration specifically.

BRIEF SUMMARY OF THE INVENTION

This present invention discloses a liquid crystal television receiver and a liquid crystal display device that is able to prevent waste of electric power at a backlight during suspension of input of image signals from an external input terminal to which an external device is connected, and to smoothly restore a luminance of the backlight to a normal level when an image signal is inputted after the suspension of input of image signals.

One aspect of the present invention provides a liquid crystal display device, comprising: a backlight that has a discharge lamp as a light source for illuminating a liquid crystal panel from a rear side thereof in order to display an image on a screen; an inverter circuit including: a first FET and a second FET that alternately operate to generate a predetermined alternating voltage; a first tube-current setting resistor element that determines a voltage supplied to a gate of the first FET and includes a first resistor and a second resistor that are connected to each other in series; a second tube-current setting resistor element that determines a voltage supplied to a gate of the second FET and includes a third resistor and a fourth resistor that are connected to each other in series; a transformer that elevates the alternating voltage and applies the elevated alternating voltage to the discharge lamp; and a first transistor that has a base, an emitter, and a collector, the emitter and the collector are respectively connected to two opposite ends of the second resistor, the first transistor bypassing the second resistor when a voltage is applied to the base of the first transistor; a second transistor that has a base, an emitter, and a collector, the emitter and the collector are respectively connected to two opposite ends of the third resistor, the second transistor bypassing the third resistor when a voltage is applied to the base of the second transistor; and a signal inputter that inputs an ON/OFF signal to the bases of the first transistor and the second transistor.

In this liquid crystal display device, the signal inputter inputs an ON/OFF signal to the bases of the first and second transistors to change resistances of the first and second tube-current setting resistor elements in order to change the value of the current supplied to the discharge lamp. That is, it is enabled to change the power consumed by the liquid crystal display device in accordance with the state of use thereof. Thus, a power consumption according to the state of use is achieved. The inverter circuit can generate an alternating voltage that can turn on the discharge lamp, by applying a voltage to the gate of the first FET via only the first resistor and to the gate of the second FET via only the fourth resistor. However, the inverter circuit can generate an alternating voltage that can turn on the discharge lamp, also by applying a voltage to the gate of the first FET via both the first and second resistors and to the gate of the second FET via both the third and fourth resistors. That is, the signal inputter changes a tube current by changing the resistance within a range capable of turning on the discharge lamp. When it is desired to decrease the power consumed, the signal inputter decreases the tube current within the range capable of turning on the discharge lamp, and thus there is shortened the time taken for the luminance of the discharge lamp to stabilize when the tube current is increased or restored from the decreased state. Hence, the liquid crystal display device of the invention can decrease the power consumed by the discharge lamp when the luminance is not required to be high, as well as immediately increase the luminance when the luminance is required to be high.

An optional aspect of the present invention provides the liquid crystal display device comprising a synchronizing-signal detector which operates to detect a synchronizing signal included in an image signal inputted to the liquid crystal display device, and wherein when the synchronizing-signal detector detects the synchronizing signal, the signal inputter outputs to the first and second transistors an OFF signal, and when the synchronizing-signal detector does not detect the synchronizing signal, the signal inputter outputs to the first and second transistors an ON signal after a predetermined time has elapsed.

That is, since a synchronizing signal is necessarily inputted when an image signal is inputted, whether an image signal is inputted or not is determinable on the basis of whether a synchronizing signal is inputted or not. Thus, it is possible to increase the tube current to increase the luminance of the screen when it is determined that an image signal is inputted, and to decrease the tube current to lower the power consumed when it is determined that an image signal is not inputted. The synchronizing signal may be, for instance, a decoding synchronizing signal such as a horizontal synchronizing signal, a vertical synchronizing signal, and a composite synchronizing signal.

Another optional aspect of the present invention provides the liquid crystal display device according to claim 2, wherein the signal inputter is a microcomputer which has a control terminal connected to the bases of the first and second transistors, and outputs from the control terminal a signal with a predetermined voltage in order to turn on and off the first and second transistors by way of a voltage of the signal outputted from the control terminal.

Another optional aspect of the present invention provides a liquid crystal television receiver, comprising: a liquid crystal panel that is illuminated from a rear side thereof by a backlight having a discharge lamp as a light source; a tuner that receives a television broadcast signal and extracts an image signal from the television broadcast signal; an external input terminal through which an image signal is inputted from an external device; an image signal processing portion to which the image signal from one of the tuner and the external input terminal is inputted, and which outputs the image signal after processing the image signal in a predetermined manner; a panel drive circuit that drives display cells of the liquid crystal panel on the basis of the image signal outputted from the image signal processing portion; an inverter circuit including: a first FET and a second FET that alternately operate to generate a predetermined alternating voltage; a first tube-current setting resistor element that determines a voltage supplied to a gate of the first FET and includes a first resistor and a second resistor that are connected to each other in series; a second tube-current setting resistor element that determines a voltage supplied to a gate of the second FET and includes a third resistor and a fourth resistor that are connected to each other in series; a transformer that elevates the alternating voltage and applies the elevated alternating voltage to the discharge lamp; and a first transistor that has a base, an emitter, and a collector, the latter two being respectively connected to two opposite ends of the second resistor, the first transistor bypassing the second resistor when a voltage is applied to the base of the first transistor; a second transistor that has a base, an emitter, and a collector, the emitter and the collector are respectively connected to two opposite ends of the third resistor, the second transistor bypassing the third resistor when a voltage is applied to the base of the second transistor; and a microcomputer that selectively inputs to the image signal processing portion one of the image signal from the tuner and the image signal inputted through the external input terminal, and has a control terminal connected to the bases of the first transistor and the second transistor to be capable of turning on and off the first transistor and the second transistor by way of a voltage outputted from the control terminal, such that when the image signal from the tuner is selectively inputted to the image signal processing portion, the microcomputer turns off the first transistor and the second transistor, and when the image signal inputted through the external input terminal is selectively inputted to the image signal processing portion, the microcomputer determines whether a synchronizing signal is included in the image signal, and when it is determined that the synchronizing signal is included in the image signal, the microcomputer turns off the first transistor and the second transistor, and when it is determined that the synchronizing signal is not included in the image signal, the microcomputer turns on the first transistor and the second transistor after a predetermined time has elapsed.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Hereinafter, an embodiment of the present invention will be described in the following order.

Figure 1:
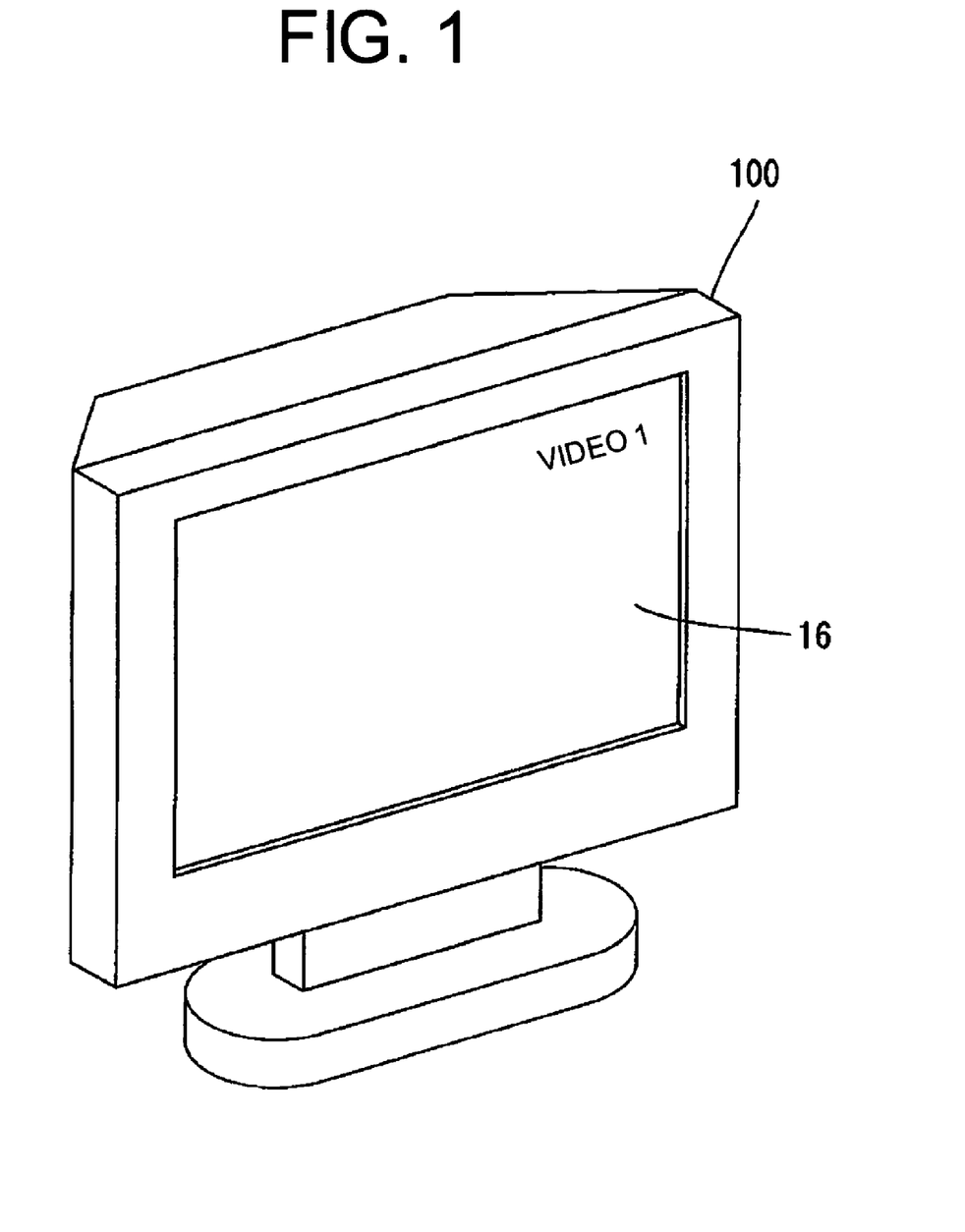
FIG. 1 is an external perspective view of a liquid crystal television receiver according to an embodiment of the invention.
Figure 2:
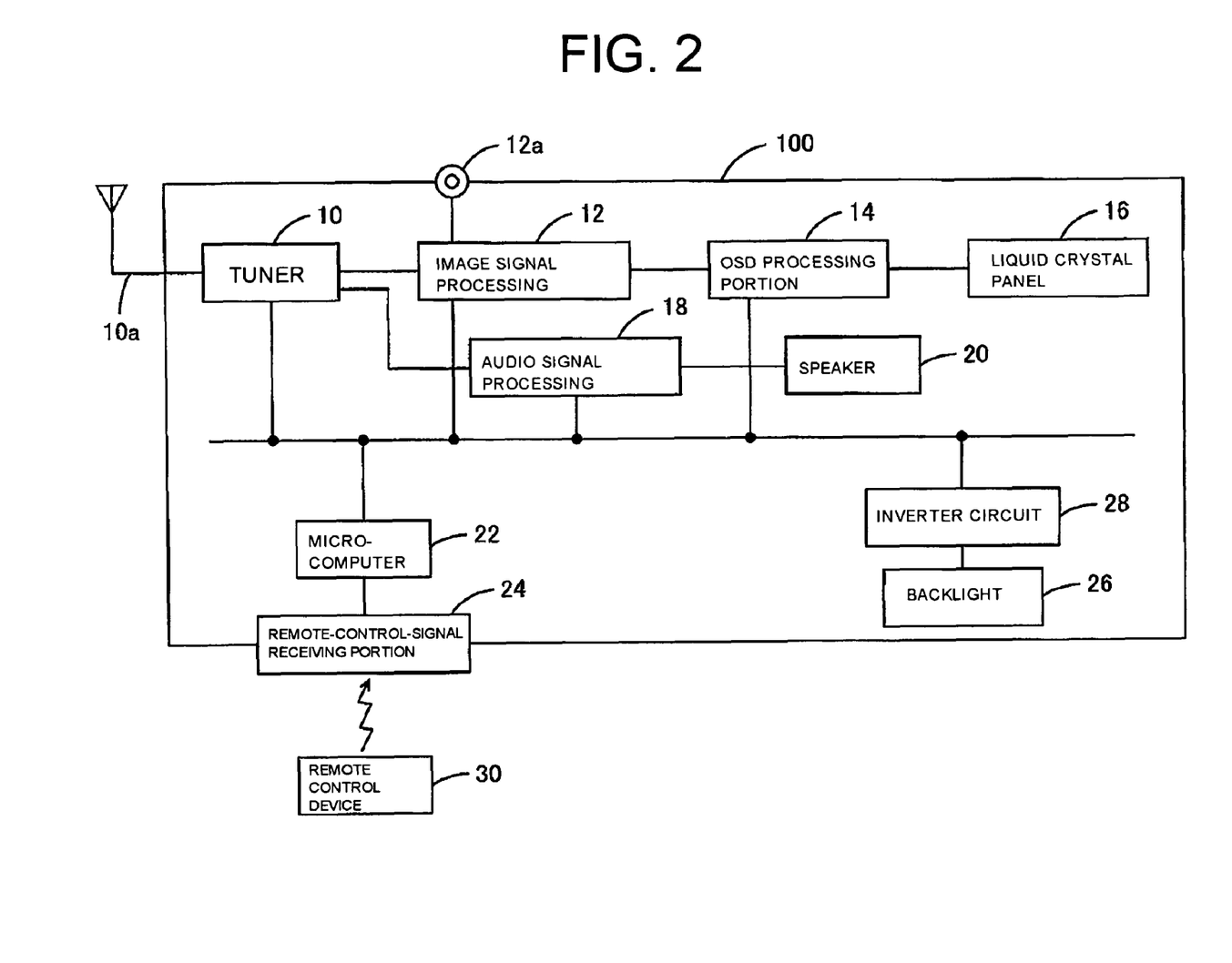
FIG. 2 is a block diagram of the liquid crystal television receiver.

(1) General structure of the liquid crystal television receiver (2) Configuration of the inverter circuit (3) Processing of the microcomputer for controlling the tube current (4) Gist of the embodiment (1) General structure of the liquid crystal television receiver Referring to a perspective view of FIG. 1, reference numeral 100 generally denotes the liquid crystal television receiver 100. FIG. 2 is a block diagram schematically illustrating the liquid crystal television receiver 100. It is noted that the liquid crystal television receiver 100 is described only as one example of a liquid crystal display device as an embodiment of the invention, and the invention is not limited thereto. The invention is applicable to any liquid crystal display device having a backlight including a discharge lamp that illuminates a liquid crystal panel from a rear side thereof.

The invention may be otherwise embodied with various modifications without departing from the scope and spirit of the invention.

The liquid crystal television receiver 100 is mainly constituted by a tuner 10, an image signal processing portion 12, an audio signal processing portion 18, a microcomputer 22, a liquid crystal panel 16, a speaker 20, an OSD processing portion 14, a remote-control-signal receiving portion 24 that receives a remote control signal from a remote control device 30, a backlight 26 that illuminates the liquid crystal panel 16 from the rear side, and an inverter circuit 28 that supplies a voltage to the backlight 26 to drive the backlight 26.

In the liquid crystal television receiver 100, the tuner 10 receives a television broadcast signal via an antenna 10a under control by the microcomputer 22. The tuner 10 then extracts an image signal as an intermediate frequency signal from the television broadcast signal while implementing predetermined processings such as signal amplification, and outputs the processed image signal to the image signal processing portion 12.

The image signal processing portion 12 digitizes the inputted image signal according to its signal level and implements a matrix conversion processing on the basis of a luminance signal and a color difference signal that are extracted from the image signal, whereby generating a RGB (red, green and blue) signal as image data. The image signal processing portion 12 implements a scaling processing with respect to the RGB signal, which processing is suited to a pixel count (or aspect ratio m:n) of the liquid crystal panel 16, and generates image data of an amount corresponding to one screen displayed on the liquid crystal panel 16. The image data generated in this way is outputted to the liquid crystal panel 16 which displays an image based on the image data.

The image signal processing portion 12 is connected to an external input terminal 12a, and can process image signals under control by the microcomputer 22 such that an image signal source, from which an image signal is inputted to the image signal processing portion 12 to be processed thereby, is switchable between the tuner 10 and the external input terminal 12a, which switching is controlled by the microcomputer 22. While image signals are inputted from the external input terminal 12a or the tuner 10, the microcomputer 22 receives, from the image signal processing portion 12, those kinds of signals that are always included in image signals, such as HSYNC (horizontal synchronizing signal) and VSYNC (vertical synchronizing signal).

The microcomputer 22 determines or detects whether a synchronizing signal is included in each image signal, and starts counting time when input of the synchronizing signal is suspended or ceased. When the time count exceeds a predetermined value, the microcomputer 22 implements a processing to control a tube current of the inverter circuit 28, which will be referred to as "tube-current control processing". However, in place of the microcomputer 22, the image signal processing portion 12 may implement the processings of detecting the synchronizing signal and counting the time after the suspension of input of synchronizing signals. Where the image signal processing portion 12 implements these processings, the image signal processing portion 12 outputs to the microcomputer 22 a signal indicating that the time count exceeds the predetermined value, if the case applies, and the microcomputer 22 having received this signal implements the tube-current control processing.

The OSD processing portion 14 implements processings such as (i) superposing an on-screen display signal (OSD signal) on the image data inputted from the image signal processing portion 12 in order to display a static image in overlapping with an image, and (ii) replacing the static image from one to another. More specifically, when data such as textual information is inputted from the microcomputer 22 to the OSD processing portion 14, the OSD processing portion 14 generates a static image on the basis of the textual information and superposes the static image on image data. The OSD processing portion 14 outputs to the liquid crystal panel 16 the image data on which the OSD signal is superposed. When data such as textual information is not inputted from the microcomputer 22, the OSD processing portion 14 does not process the image data inputted from the image signal processing portion 12 and outputs to the liquid crystal panel 16 the image data as-is.

The liquid crystal panel 16 has a panel drive circuit for driving pixels, and drives display cells of the liquid crystal panel 16 in accordance with the image data inputted from the OSD processing portion 14, in order to display an image on the screen.

The inverter circuit 28 is supplied with a dc voltage from a power supply circuit (not shown), converts the dc voltage to a high-level ac voltage, and supplies the ac voltage as a drive signal to the backlight 26. The power supply circuit receives a power supply voltage (ac voltage), for instance from an external commercial power source, and supplies the power supply voltage to circuits such as those of the microcomputer 22 and the inverter circuit 28, after converting the voltage from ac to dc, if necessary.

The backlight 26 has a plurality of fluorescent tubes as discharge lamps, and functions as a light source for illuminating the liquid crystal panel 16 from the rear side. That is, the backlight 26 is turned on by the high voltage supplied from the inverter circuit 28, and illuminates the liquid crystal panel 16 from the rear side. In the present embodiment, cold cathode fluorescent tubes are employed for the backlight.

The microcomputer 22 is electrically connected to components constituting the liquid crystal television receiver 100. A CPU as a component of the microcomputer 22 controls operation of the liquid crystal television receiver 100 as a whole, according to programs written in a ROM, a RAM and others as other components of the microcomputer 22. The CPU, ROM and RAM are not shown.

Upon reception of a voltage signal from the remote-control-signal receiving portion 24, the microcomputer 22 determines a key operation corresponding to the voltage signal, and responds to an instruction that is represented by the key operation and inputted through the remote control device 30, namely, the microcomputer 22 implements control operation corresponding to the instruction, under control by the CPU. However, this embodiment may be modified such that the television receiver 100 has, in addition to the remote-control-signal receiving portion 24, a CH setting switch and other kinds of function setting switches, and the microcomputer 22 receives a signal on the basis of an operation of these switches and implements a corresponding control operation.

The microcomputer 22 outputs to the image signal processing portion 12 a control signal instructing on an image signal processing, and outputs to the audio signal processing portion 18 a control signal instructing on an audio signal processing and an audio signal output level. The microcomputer 22 outputs to the OSD processing portion 14 a control signal instructing to generate the OSD signal that is indicative of characters or a figure to be displayed in superposition on image data, and outputs to the liquid crystal panel 16 a control signal instructing to superpose the characters or figure on the image data. The microcomputer 22 further outputs to the inverter circuit 28 a control signal instructing to turn on or off the backlight 26.

Where the microcomputer 22 receives from the image signal processing portion 12 a notification that no image signals have been inputted from the external input terminal 12a for a predetermined time period, the microcomputer 22 outputs a control signal instructing to decrease the value of an inverter current that is supplied from the inverter circuit 28 to the backlight 26. The control to decrease the inverter current and a processing of the microcomputer 22 implemented for this control will be later described in detail.

The remote control device 30 has a plurality of keys and a remote-control-signal transmitting circuit. An instruction of a user is inputted through the keys, and the remote-control-signal transmitting circuit operates to transmit a remote control signal to the remote-control-signal receiving portion 24. That is, the remote control device 30 sends out a remote control signal corresponding to an operation or manipulation of the keys and in a predetermined format. For instance, when the user desires to have the television receiver 100 receive a television broadcast signal of a channel and accordingly operates or manipulates the remote control device 30, a corresponding remote control signal is sent out from a remote-control-signal transmitting portion. The microcomputer 22 receives the remote control signal via the remote-control-signal receiving portion 24, and sends out to the tuner 10 frequency data instructing to receive the broadcast signal of the desired channel.

(2) Configuration of the Inverter Circuit

Figure 3:
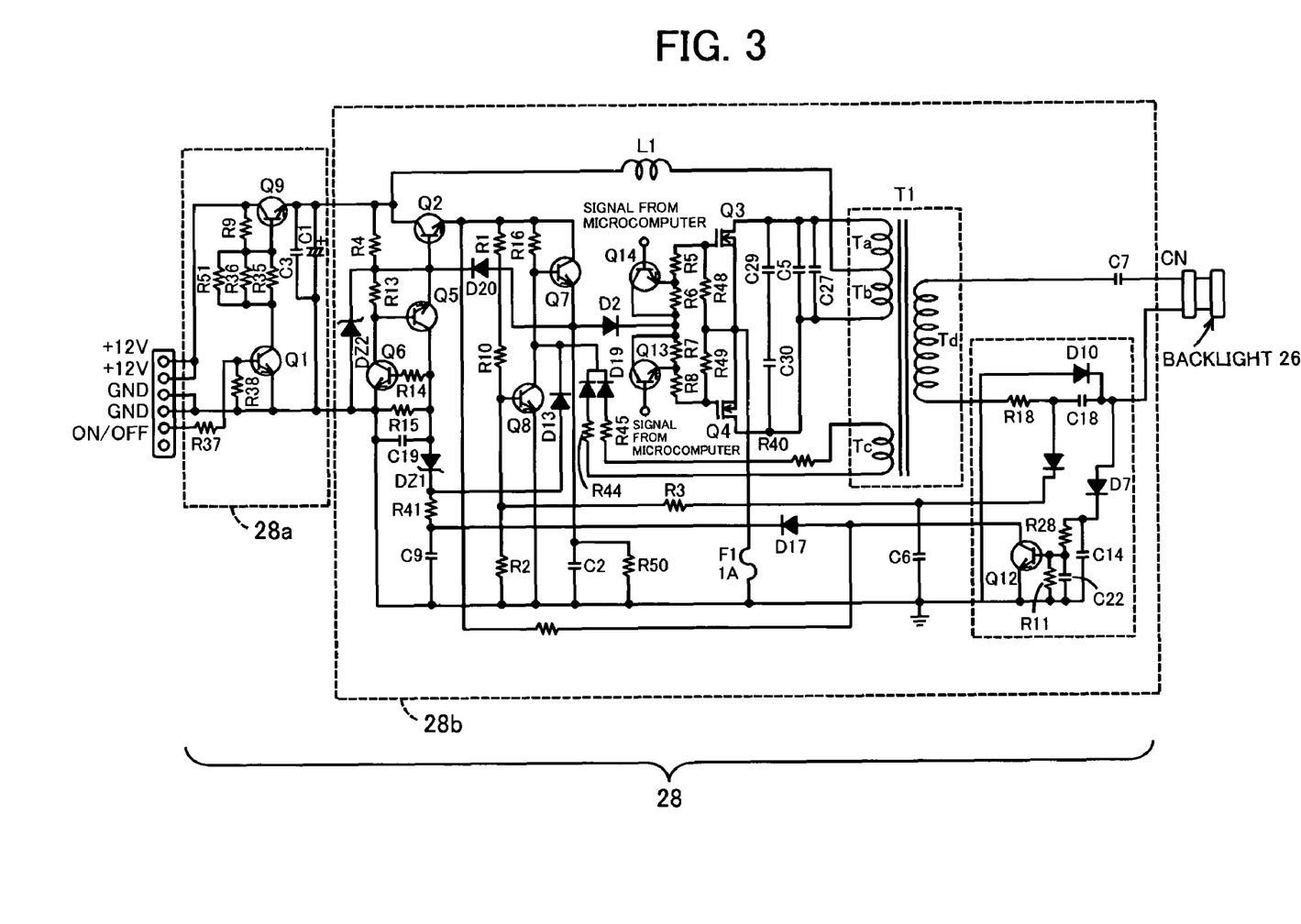
FIG. 3 is a diagram of an example of an inverter circuit in the television receiver.

There will be now described the inverter circuit 28 of the embodiment, by referring to FIG. 3. The inverter circuit used in the liquid crystal display device and liquid crystal television receiver of the invention is not limited to the form described herein, but may take any forms, e.g., push-pull voltage resonant circuit, as long as the inverter circuit is configured to receive a dc voltage and output the voltage as amplified and dc-ac converted by an oscillating circuit.

The inverter circuit 28 is a self-excited oscillating circuit and mainly composed of a switch portion 28a and a main portion 28b. The switch portion 28a is supplied with a 12V dc power through a connector CN1, and receives a control signal (ON/OFF signal) from the microcomputer 22.

When an ON signal is inputted to the switch portion 28a from the microcomputer 22, a current flows between a base and an emitter of a transistor Q1, causing a current flow between the emitter and a collector thereof. Hence, a current flows between a base and an emitter of a transistor Q9, and then a current flows between the emitter and a collector thereof. Thus, supply of the dc voltage to the main portion 28b is started. When an OFF signal is inputted to the switch portion 28a, on the other hand, the supply of the dc voltage is suspended. The dc voltage supplied to the switch portion 28a is supplied to the main portion 28b after being smoothed by an electrolytic capacitor C1 as a smoothing circuit.

The main portion 28b of the inverter circuit 28 is a self-excited oscillating circuit. That is, the main portion 28b includes a FET (field-effect transistor) Q3 (first FET), a FET Q4 (second FET), and a transformer T1, and oscillates by itself to generate an alternating current for turning on the cold cathode fluorescent tubes of the backlight 26. More specifically, when an ON signal is inputted to the switch portion 28a, a bias power (dc voltage) supplied from the power supply circuit via a diode D2 is applied to a gate electrode of a FET Q3 via a resistor R5 (first resistor) and a resistor R6 (second resistor) that are connected to each other in series, and to a gate electrode of a FET Q4 via a resistor R7 (third resistor) and a resistor R8 (fourth resistor) that are connected to each other in series. That is, the resistors R5 and R6 constitute a first tube-current setting resistor element, and the resistors R7 and R8 constitute a second tube-current setting resistor element.

Then, the FET Q3 and the FET Q4 alternately and repeatedly turn on and off by way of feedback from a control winding Tc, so that an alternating voltage of a predetermined frequency is generated at the upstream side of the transformer T1. The resistors R5, R6 determining the voltage applied to the gate electrode of the FET Q3, and the resistors R7, R8 determining the voltage applied to the gate electrode of the FET Q4, determine the voltage generated at the upstream side of the transformer T1, and ultimately determine the current (i.e., tube current) generated at the downstream side of the transformer T1. Hereinafter, each pair of resistors R5, R6 and resistors R7, R8 will be collectively referred to as "tube-current setting resistor element".

Resistances of the resistors R5 and R6, and those of the resistors R7 and R8 are determined so that, for instance, when the resistors R6 and R7 are bypassed by a transistor Q13 (second transistor) and a Q14 (first transistor), respectively, the tube current flowing in the backlight 26 is 6 mA, and when the resistors R6 and R7 are not bypassed by the transistors Q13 and Q14, respectively, the tube current flowing in the backlight 26 is 7 mA.

The upstream side of the transformer T1 is constituted by a first winding Ta, an end of which is connected to a drain electrode of the FET Q3, a second winding Tb, an end of which is connected to a drain electrode of the FET Q4, and the control winding Tc. The downstream side of the transformer T1 is constituted by a third winding Td. The other end of the first winding Ta and that of the second winding Tb are supplied with a positive power of about 12V via a coil L1. The control winding Tc feeds a part of the output as amplified back to the input sides of the FETs Q3 and Q4 in order to alternately turn on the FETs Q3 and Q4 in a predetermined cycle, thereby inverting the polarity of the voltage generated at the first and second windings Ta and Tb in a predetermined cycle. Thus, the transformer T1 elevates the alternating voltage received at its upstream side and outputs the elevated voltage from its downstream side, thereby applying the alternating voltage as elevated to the backlight 26 to turn on the backlight 26.

In the tube-current setting resistor elements, two opposite ends of the resistor R6 are respectively connected to an emitter and a collector of the transistor Q14 provided for bypassing the resistor R6, and two opposite ends of the resistor R7 are respectively connected to an emitter and a collector of the transistor Q13 provided for bypassing the resistor R7. The bases of the transistors Q14, Q13 are connected to a control terminal of the microcomputer 22. When a high-level voltage signal is outputted from the control terminal of the microcomputer 22, the transistors Q13, Q14 turn on, and when a low-level voltage signal is outputted, the transistors Q13, Q14 turn off. The transistors Q14, Q13 are connected such that when the transistors Q14, Q13 bypass the resistors R6, R7, respectively, electric current flows from the collectors thereof to the respective emitters.

That is, when a high-level voltage signal is outputted from the microcomputer 22, the FET Q3 receives a voltage from the diode D2 via the transistor Q14 and the resistor R5, and the FET Q4 receives a voltage from the diode D2 via the transistor Q13 and the resistor R8. Thus, in this case, a tube-current setting resistor element is constituted by the resistor R5 with respect to the FET Q3, and by the resistor R8 with respect to the FET Q4. On the other hand, when a low-level voltage signal is outputted from the microcomputer 22, the FET Q3 receives a voltage from the diode D2 via the resistors R6 and R5, and the FET Q4 receives a voltage from the diode D2 via the resistors R7 and R8. In this case, a tube-current setting resistor element is constituted by the resistors R5 and R6 with respect to the FET Q3, and by the resistors R7 and R8 with respect to the FET Q4.

(3) Processing of the Microcomputer for Controlling the Tube Current

Figure 4:
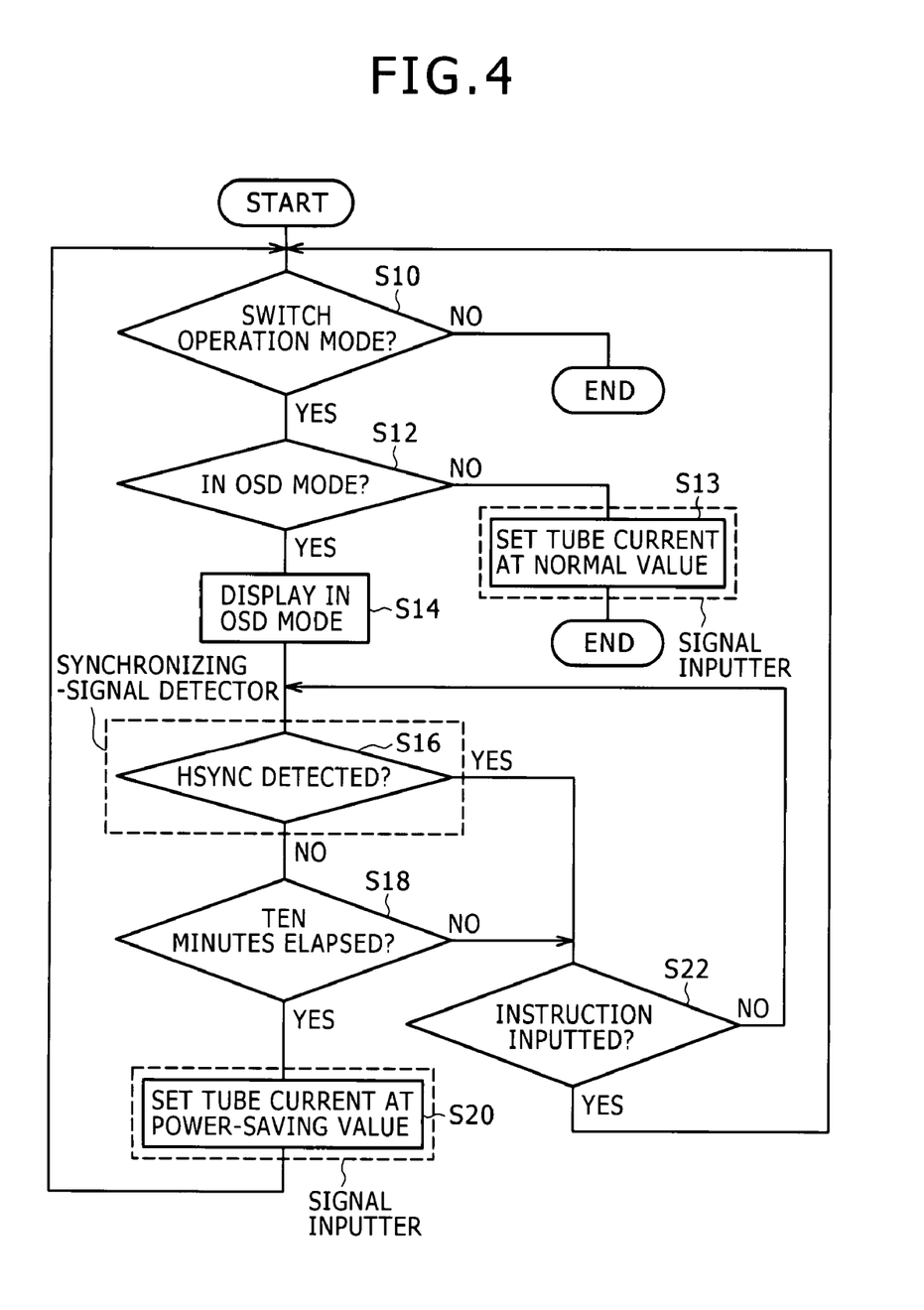
FIG. 4 is a flowchart illustrating a processing implemented by a microcomputer to control a tube current.

There will be now described, with reference to FIG. 4, a processing implemented by the microcomputer to control the tube current by controlling the tube-current setting resistor elements. FIG. 4 shows a flowchart illustrating the processing for controlling the tube current which is implemented by the microcomputer. This processing is reiterated after the liquid crystal television receiver 100 is powered on.

The processing flow begins with step S10 in which it is determined whether the operation mode is switched. That is, it is determined whether the user manipulates the remote control device 30 to input an instruction to switch an image signal source, from which image signals to be processed by the image signal processing portion 12 are inputted, between the tuner 10 receiving and outputting the television broadcast signals, and the external input terminal 12a outputting image signals. More specifically, it is determined whether a voltage signal indicative of switching between the tuner 10 and the external input terminal 12a is inputted from the remote-control-signal receiving portion 24.

When the voltage signal indicative of the switching is inputted, a control signal instructing to switch the operation mode of the liquid crystal television receiver 100 is outputted to the image signal processing portion 12. For instance, where the currently selected operation mode of the liquid crystal television receiver 100 is a TV mode, in which images based on the television broadcast signals inputted from the tuner 10 are displayed on the screen, a control signal instructing to switch the operation mode from the TV mode to a video mode, in which images based on the image signals inputted from the external input terminal 12a are displayed on the screen, is outputted to the image signal processing portion 12. On the other hand, where the currently selected operation mode is the video mode, a control signal instructing to switch the operation mode to the TV mode is outputted to the image signal processing portion 12.

Thus, when it is determined that the voltage signal indicative of the switching is inputted, the condition to proceed to step S12 is satisfied and thus the processing flow proceeds to step S12. On the other hand, when it is determined that the voltage signal indicative of the switching is not inputted, the condition to proceed to step S12 is not satisfied and step S10 is repeated.

In step S12, it is determined whether the currently selected operation mode is the video mode. More specifically, whether the currently selected operation mode is the video mode is determined by determining whether an image of VIDEO 1, for instance, is selected to be displayed, in an OSD mode, on the screen of the liquid crystal panel 16. That is, the microcomputer 22 outputs to the OSD processing portion 14 a control signal instructing to have the liquid crystal panel 16 display an image of VIDEO 1 in the OSD mode when the video mode is selected. Thus, it is possible to determine whether the currently selected mode is the video mode or the TV mode on the basis of whether a processing of outputting the control signal instructing display in the OSD mode is implemented in the microcomputer 22. However, the determination of whether the OSD mode is currently selected may be made in the following way. That is, every time the operation mode is switched, the microcomputer 22 stores information indicative of the currently selected mode, for instance in the form of the value of a register in a nonvolatile memory, and the determination regarding the OSD mode is made on the basis of the value of the register.

When the currently selected mode is the video mode, the condition to proceed to step S14 is satisfied. Thus, in step S14 the OSD processing portion 14 displays the image of VIDEO 1 in the OSD mode, and then the processing flow proceeds to step S16. On the other hand, when it is determined that the currently selected mode is the TV mode, the condition to proceed to step S14 is not satisfied, and the tube current is restored to a normal value and the present cycle of the processing flow is terminated. That is, when the presently selected mode is the TV mode, the processing flow proceeds to step S13, and the low-level voltage signal is outputted from the control terminal connected to the bases of the transistors Q13, Q14 so that the transistors Q13, Q14 turn off, and the resistors R5, R6 function as resistors for limiting the tube current with respect to the FET Q3, and the resistors R7, R8 function as resistors for limiting the tube current with respect to the FET Q4. Hence, resistances of the tube-current setting resistor elements rise, or do not change, and the voltage supplied to the backlight 26 returns to, or remains at, a normal value.

In step S16, it is determined whether the HSYNC (horizontal synchronizing signal) is detected. Synchronizing signals including the HSYNC are extracted from the television broadcast signal or image signal by the tuner 10 or the image signal processing portion 12, and the extracted synchronizing signals are supplied to the microcomputer 22. Hence, when an image signal of any kind is inputted, the microcomputer 22 can detect the HSYNC. When the HSYNC is detected, the condition to proceed to step S22 is satisfied, but when the HSYNC is not detected, the condition to proceed to step S22 is not satisfied and the processing flow proceeds to step S18. When the HSYNC is not detected, it is started to count time until the HSYNC is detected. That is, a time period during which the HSYNC is not detected continuously is counted. In a case where the HSYNCH has not been detected before step S16, the counting of the time is continued.

In step S18, it is determined whether the time period during which the HSYNC has not been detected continuously exceeds ten minutes. When it is determined that the time period exceeds ten minutes, the processing flow proceeds to step S20. On the other hand, when it is determined that the time period does not exceed ten minutes, the processing flow goes to step S22.

In step S22, it is determined whether an instruction has been inputted through the remote control device 30 during implementation of steps S10 to S18. When it is determined that a voltage signal corresponding to an instruction inputted through the remote control device 30 has been received from the remote-control-signal receiving portion 24, the processing flow returns to step S10 and step S10 and the following steps are repeated. In this case, it is determined in step S10 whether the instruction inputted, including that inputted in step S22, was to switch the operation mode. On the other hand, when it is determined that a voltage signal corresponding to an instruction inputted through the remote control device 30 has not been received from the remote-control-signal receiving portion 24, the processing flow returns to step S16 and step S16 and the following steps are repeated.

In step S20, the tube current is set at a value for power saving, and the processing flow returns to step S10 and step S10 and the following steps are repeated. That is, the high-level voltage signal is outputted from the control terminal connected to the bases of the transistors Q13, Q14 so that the transistors Q13, Q14 turn on, and the resistor R5 functions as a resistor for limiting the tube current with respect to the FET Q3, and the resistor R8 functions as a resistor for limiting the tube current with respect to the FET Q4. Hence, the resistances of the tube-current setting resistor elements decrease, and the voltage supplied to the backlight 26 is set, or remains, at a value for power saving. Thus, the electric power consumed by the backlight 26 decreases, thereby saving power. Since even in this power-saving state the tube current flows in the cold cathode fluorescent tube, the luminance immediately rises when the power-saving state is eliminated and returns to the normal state. Even in a case where a plurality of cold cathode fluorescent tubes are used, all the cold cathode fluorescent tubes are turned on by the same tube current and thus at the same luminance whether in the power-saving state or in the normal state, thereby solving the conventionally encountered problem of variation in the luminance among the plurality of tubes or discharge lamps.

Hence, when the user manipulates the remote control device 30 to switch the operation mode to the video mode in which the image signals from the external input terminal 12a are displayed on the screen, the image signals from the external input terminal 12a are inputted into the image signal processing portion 12. In the video mode, whether there is inputted an image signal from the external input terminal 12a or not, the OSD processing portion 14 makes image data as outputted to the liquid crystal panel 16 include, at an upper right corner, an indication that input from an external device is currently selected, such as characters "VIDEO 1", namely, at an upper right corner of the screen of the liquid crystal panel 16, an indication "VIDEO 1" is presented.

When ten minutes have elapsed with the indication "VIDEO 1" presented on the screen, the microcomputer 22 turn the transistors Q13, Q14 on, thereby making the resistors R6, R7 bypassed to decrease the resistance to the tube current, in order to lower the luminance of the backlight and power consumed thereby.

When the user manipulates the remote control device 30 to switch the operation mode to the TV mode in this state, the television broadcast signal is inputted from the tuner 10 and the HSYNC is supplied to the microcomputer 22. Then, the microcomputer 22 turns the transistors Q13, Q14 off to elevate the resistance to the tube current, thereby restoring the luminance of the backlight and the power consumed thereby. Since the backlight has not been completely off until then, the luminance is immediately increased and the user does not feel uncomfortable.

A portion of the microcomputer 22 that operates to implement step S16 to determine whether the synchronizing signal is included in the image signal inputted to the image signal processing portion 12 constitutes a synchronizing-signal detector. A portion of the microcomputer 22 that operates to implement steps S13 and S20 constitutes a signal inputter.

(4) Gist of the Embodiment

To sum up, the liquid crystal television receiver of the embodiment includes an inverter circuit 28, transistors Q14, Q13, and a microcomputer 22. The inverter circuit 28 includes resistors R5, R6, R7, R8 determining the value of a tube current that is supplied to cold cathode fluorescent tubes of a backlight 26, and supplies to the cold cathode fluorescent tubes an alternating voltage. An emitter and a collector of the transistor Q14 are connected to two opposite ends of the resistor R6, and an emitter and a collector of the transistor Q13 are connected to two opposite ends of the resistor R7. The microcomputer 22 has a control terminal connected to bases of the transistors Q13, Q14, and detects a synchronizing signal in an image signal inputted to an image signal processing portion 12. When a synchronizing signal is detected, the microcomputer 22 outputs a low-level voltage to the control terminal. When a synchronizing signal is not detected, the microcomputer outputs a high-level voltage to the control terminal after a predetermined time has elapsed. Thus, it is enabled to prevent waste of power at the backlight during an image signal is not inputted from an external input terminal with which an external device is connected, as well as to smoothly restore the luminance of the backlight to a normal level when an image signal is inputted after suspension of input of image signals.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A liquid crystal television receiver, comprising:
a liquid crystal panel that is illuminated from a rear side thereof by a backlight having a discharge lamp as a light source;
a tuner that receives a television broadcast signal and extracts an image signal from the television broadcast signal;
an external input terminal through which an image signal is inputted from an external device;
an image signal processing portion to which the image signal from one of the tuner and the external input terminal is inputted, and which outputs the image signal after processing the image signal in a predetermined manner;
a panel drive circuit that drives display cells of the liquid crystal panel on the basis of the image signal outputted from the image signal processing portion;
an inverter circuit including:
a first FET and a second FET that are connected with a transformer alternately operate to make the transformer generates a predetermined alternating voltage;
a first tube-current setting resistor element that is connected to a gate of the first FET, determines a bias voltage supplied to the gate of the first FET based on the value of resistance set up and includes a first resistor and a second resistor that are connected to each other in series;
a second tube-current setting resistor element that is connected to a gate of the second FET, determines a bias voltage supplied to the gate of the second FET based on the value of resistance set up and includes a third resistor and a fourth resistor that are connected to each other in series;

the transformer that elevates the alternating voltage and applies the elevated alternating voltage to the discharge lamp; and a first transistor that has a base, an emitter, and a collector, the latter two being respectively connected to two opposite ends of the second resistor, the first transistor bypassing the second resistor when a voltage is applied to the base of the first transistor;

a second transistor that has a base, an emitter, and a collector, the emitter and the collector are respectively connected to two opposite ends of the third resistor, the second transistor bypassing the third resistor when a voltage is applied to the base of the second transistor; and a microcomputer that selectively inputs to the image signal processing portion one of the image signal from the tuner and the image signal inputted through the external input terminal, and has a control terminal connected to the bases of the first transistor and the second transistor to be capable of turning on and off the first transistor and the second transistor by way of a voltage outputted from the control terminal, such that when the image signal from the tuner is selectively inputted to the image signal processing portion, the microcomputer turns off the first transistor and the second transistor, and when the image signal inputted through the external input terminal is selectively inputted to the image signal processing portion, the microcomputer determines whether a synchronizing signal is included in the image signal, and when it is determined that the synchronizing signal is included in the image signal, the microcomputer turns off the first transistor and the second transistor, and when it is determined that the synchronizing signal is not included in the image signal, the microcomputer turns on the first transistor and the second transistor after a predetermined time has elapsed.

2. A liquid crystal display device, comprising:

a backlight that has a discharge lamp as a light source for illuminating a liquid crystal panel from a rear side thereof in order to display an image on a screen;

an inverter circuit including:

a first FET and a second FET that are connected with a transformer alternately operate to make the transformer generates a predetermined alternating voltage;

a first tube-current setting resistor element that is connected to a gate of the first FET, determines a bias voltage supplied to the gate of the first FET based on the value of resistance set up and includes a first resistor and a second resistor that are connected to each other in series;

a second tube-current setting resistor element that is connected to a gate of the second FET, determines a bias voltage supplied to the gate of the second FET based on the value of resistance set up and includes a third resistor and a fourth resistor that are connected to each other in series;

the transformer that elevates the alternating voltage and applies the elevated alternating voltage to the discharge lamp; and a first transistor that has a base, an emitter, and a collector, the emitter and the collector are respectively connected to two opposite ends of the second resistor, the first transistor bypassing the second resistor when a voltage is applied to the base of the first transistor;

a second transistor that has a base, an emitter, and a collector, the emitter and the collector are respectively connected to two opposite ends of the third resistor, the second transistor bypassing the third resistor when a voltage is applied to the base of the second transistor; and a signal inputter that inputs an ON/OFF signal to the bases of the first transistor and the second transistor in order to change the value of resistance of the first tube-current setting resistor element and the value of resistance of the second tube-current setting resistor element.

3. The liquid crystal display device according to claim 2, further comprising a synchronizing-signal detector which operates to detect a synchronizing signal included in an image signal inputted to the liquid crystal display device, and wherein when the synchronizing-signal detector detects the synchronizing signal, the signal inputter outputs to the first and second transistors an OFF signal, and when the synchronizing-signal detector does not detect the synchronizing signal, the signal inputter outputs to the first and second transistors an ON signal after a predetermined time has elapsed.

4. The liquid crystal display device according to claim 2, wherein the signal inputter is a microcomputer which has a control terminal connected to the bases of the first and second transistors, and outputs from the control terminal a signal with a predetermined voltage in order to turn on and off the first and second transistors by way of a voltage of the signal outputted from the control terminal.

* * * * *